US008865246B2

(12) United States Patent
Mizushima et al.

(10) Patent No.: US 8,865,246 B2
(45) Date of Patent: Oct. 21, 2014

(54) OIL OR FAT COMPOSITION, CHOCOLATE AND COMBINED CONFECTIONERY

(71) Applicant: Fuji Oil Company Limited, Osaka (JP)

(72) Inventors: Shigeki Mizushima, Osaka (JP); Hitomi Omori, Osaka (JP); Masayuki Matsui, Osaka (JP)

(73) Assignee: Fuji Oil Company Limited, Osaka (JP)

( * ) Notice: Subject to any disclaimer, the term of this patent is extended or adjusted under 35 U.S.C. 154(b) by 0 days.

(21) Appl. No.: 14/355,307

(22) PCT Filed: Oct. 31, 2012

(86) PCT No.: PCT/JP2012/078144
§ 371 (c)(1),
(2), (4) Date: Apr. 30, 2014

(87) PCT Pub. No.: WO2013/065726
PCT Pub. Date: May 10, 2013

(65) Prior Publication Data
US 2014/0272082 A1    Sep. 18, 2014

(30) Foreign Application Priority Data

Nov. 2, 2011  (JP) .................................. 2011-241459

(51) Int. Cl.
A23G 1/00    (2006.01)
A23D 9/00    (2006.01)
A23G 1/36    (2006.01)

(52) U.S. Cl.
CPC ........................................ A23G 1/36 (2013.01)
USPC .......................................... 426/607; 426/631

(58) Field of Classification Search
None
See application file for complete search history.

(56) References Cited

U.S. PATENT DOCUMENTS

| 4,873,109 | A  | * | 10/1989 | Tanaka et al. ................. 426/607 |
| 4,882,192 | A  | * | 11/1989 | Maeda et al. ................. 426/607 |
| 6,103,292 | A  | * | 8/2000  | Del Vecchio ................. 426/601 |
| 6,475,548 | B2 |   | 11/2002 | Bons et al. |
| 6,777,018 | B2 | * | 8/2004  | Floeter et al. ................. 426/603 |
| 8,182,857 | B2 | * | 5/2012  | Cleenewerck et al. ........ 426/601 |
| 8,304,010 | B2 | * | 11/2012 | Cleenewerck ................. 426/607 |
| 8,460,737 | B2 | * | 6/2013  | Cleenewerck et al. ........ 426/607 |
| 8,475,865 | B2 | * | 7/2013  | Elleman et al. ................ 426/631 |
| 2012/0027912 | A1 |   | 2/2012 | Sagi et al. |
| 2012/0052539 | A1 | * | 3/2012 | Favre et al. ................... 435/134 |
| 2013/0052326 | A1 | * | 2/2013 | Bhaggan et al. .............. 426/607 |
| 2013/0266716 | A1 | * | 10/2013 | Bartoccini et al. ............ 426/603 |

FOREIGN PATENT DOCUMENTS

| EP | 0069599 | * | 8/2002 |
| EP | 1 889 898 |  | 2/2008 |
| GB | 925805 | * | 6/1958 |
| JP | 61-219338 |  | 9/1986 |
| JP | 63-248343 |  | 10/1988 |
| JP | 1-120250 |  | 5/1989 |
| JP | 5-284912 |  | 11/1993 |
| JP | 6-311845 |  | 11/1994 |
| JP | 9-176680 |  | 7/1997 |
| JP | 2001-131574 |  | 5/2001 |
| WO | 2006/112347 |  | 10/2006 |
| WO | 2007/091529 |  | 8/2007 |
| WO | 2010/110260 |  | 3/2010 |
| WO | 2011/115063 |  | 9/2011 |

OTHER PUBLICATIONS

International Search Report issued Dec. 18, 2012 in International (PCT) Application No. PCT/JP2012/078144.
J. Shuleva, "Monitoring and Controlling Oil Migration in Peanut Butter Confections", The Manufaturing Confectioner, pp. 72-74, May 1989.
English translation of the International Preliminary Report on Patentability and Written Opinion dated May 6, 2014.
Office Action in corresponding Korean Application No. 2014-7011712 dated Aug. 19, 2014.

* cited by examiner

*Primary Examiner* — Carolyn Paden
(74) *Attorney, Agent, or Firm* — Wenderoth, Lind & Ponack, L.L.P.

(57) ABSTRACT

Provided are: an oil or fat composition, which is capable of preventing the migration of oil or fat in a combined confectionery that comprises a combination of a chocolate with an oil or fat-based food material, has a good tolerance against cold blooming that is caused by the migration of oil or fat and softening of a chocolate, and enables the production of a chocolate having a high meltability in mouth; a chocolate using the oil or fat composition; and a combined confectionery using the chocolate.

10 Claims, No Drawings

OIL OR FAT COMPOSITION, CHOCOLATE AND COMBINED CONFECTIONERY

TECHNICAL FIELD

The present invention relates to an oil-and-fat composition for chocolate, having specific triglyceride composition capable of preventing bloom due to oil-and-fat migration in a composite confectionery in which chocolate and oil-and-fat based food material are combined, a chocolate including the oil-and-fat composition, and a composite confectionery including the chocolate.

BACKGROUND ART

It has been known that oil-and-fat based food materials such as chocolate, baked confectionery, snack, fried confectionery, candy, filling, nut paste can be used as a composite confectionery alone or in combination. Especially, a chocolate composite confectionery in which chocolate is combined is popular item.

A chocolate composite confectionery includes various forms. For example, so called "shell chocolate" has a form that a part called as "shell part" covers the outside of a part called as "center part" as core. Typically, an oil-and-fat which is relatively-soft at room temperature (i.e. an oil-and-fat including relatively-high level of liquid oil component) is used as a raw material of a food material for the center part in order to provide softness, good meltability in the mouth and texture different from that of the shell part.

In addition, the other variations of chocolate composite confectionery includes: a confectionery in which chocolate and nut are combined by filling fried or roasted nuts into chocolate or by coating nut with chocolate (hereinafter referred to as nut chocolate); and a confectionery in which chocolate and baked confectionery, which includes flour as main ingredient and is produced by frying or baking, such as biscuit and pretzel, are combined (hereinafter referred to as baked goods-combined chocolate).

In the shell chocolate, usually, soft oil-and-fat at room temperature is used as a raw material of a filling part of the center while hard oil-and-fat at room temperature (i.e. oil-and-fat including relatively-low level of liquid oil component), such as cocoa butter and cocoa butter alternative, is used as a raw material of the shell part. Thus, a content of liquid oil component of both parts are different.

In addition, in the nut chocolate, nut includes high level of fat-and-oil which is relatively-soft at room temperature while chocolate part includes fat-and-oil which is relatively-hard at room temperature as a raw material. Further, in the baked goods-combined chocolate, baked confectionery includes high amount of fat-and-oil which is relatively-soft at room temperature, such as margarine for kneading and oil-and-fat for spraying, while chocolate part includes fat-and-oil which is relatively-hard at room temperature as a raw material similar to the nut chocolate. Moreover, both nut and baked confectionery become to include higher amount of liquid oil when treatment such as frying is applied.

This difference of the amount of liquid oil component between the oil-and-fat based food materials causes a migration of the liquid oil from a high content part to a low content part. In the case of shell chocolate, it has been a problem that a commercial value of the shell chocolate is significantly lost by softening the shell part or whitening the surface (blooming) due to the oil-and-fat migration from the center part to the shell part.

The following three means for solving such an oil-and-fat migration are well known for a long time:
1. Increasing hardness and melting point by adding hard oil-and-fat having about 32 to 38° C. of melting point, such as cocoa butter and cocoa butter alternative, to center cream;
2. Using a fat stabilizer system (adding a small amount of high melting point oil-and-fat having 40 to 70° C. of melting point to center cream in order to make solid grid-like formation);
3. Blocking an oil-and-fat migration by coating an interface between center cream and chocolate with sugar, protein, polysaccharide film sugar etc. (Non-Patent Document 1).

Although the above means 1 can effectively reduce the oil-and-fat migration, original softness and creaminess of center cream is deteriorated and it is hard to exude flavor.

In addition, the above means 2 can reduce a cost because an effect can be obtained by adding a small amount of high melting point oil-and-fat. However, flavor of the center cream tends to be remarkably deteriorated and texture of the center cream tends to be waxy and bad in the mouth.

The last, the above means 3 seems to significantly effective. However, it is not practicable due to problems such as uncomfortable texture and complication of coating.

As a recent technology, a fats and oils composition comprising: (A) fats and oils comprising 50% or more of palm oil, and (B) fatty acid polyglycerin ester of 0.05 to 5% by weight or more, wherein the constituent fatty acid comprises oleic acid and palmitic acid of not less than 80% by weight based on the weight of constituent fatty acid, and the molar ratio of said oleic acid to said palmitic acid is 90:10 to 10:90, is proposed (Patent Document 1). However, nothing is suggested for a bloom and a softening of shell chocolate that appear when food materials having a different content of liquid oil component are combined.

Another, for a shell chocolate, an oil-and-fat composition for center cream comprising 0.1 to 0.2 wt % of lipophilic emulsifier and 0.2 wt % or less of lecithin is proposed (Patent Document 2).

For a nut chocolate, a method for preventing oil-and-fat migration by making an oil-and-fat composition of chocolate part to comprise 50 wt % or more of 2-oleo-disaturated triglyceride (SUS), 0.5 wt % or more of 2-oleo-palmito-arachidine (POA), 2 wt % or less of tri-saturated triglyceride (S3) and 0.01 wt % or more of triglyceride containing dihydroxy fatty acid (DHTG) is proposed (Patent Document 3).

For a combination of baked confectionery or nut, and oil-and-fat for chocolate, cream and spraying, a method of using an oil-and-fat composition for composite confectionery, comprising a lipophilic polyglycerol fatty acid ester and (or) a lipophilic sucrose fatty acid ester, wherein two or more of fatty acids constituting the polyglycerol fatty acid ester and the sucrose fatty acid ester are saturated fatty acid having 18 or more of carbon atoms, and wherein SFC value of the fats and oils is 20 or more at 20° C., 7 or more at 30° C. and 5 or less at 40° C. is proposed (Patent Document 4).

However, although any methods use a method of adjusting solid fat content for reducing the difference of contents of liquid oil component, or a method of cutting a crystal of oil-and-fat by adding a lipophilic polyglycerol fatty acid ester and/or a lipophilic sucrose fatty acid ester, no strategies for addressing a bloom due to an oil-and-fat migration are shown.

In addition, these inventions are the examination of the material combined with chocolate, material on the side of higher amount of liquid oil component. No solutions for the side of chocolate to which liquid oil migrates are disclosed.

Further, as an oil-and-fat composition for chocolate, a hard butter composition comprising 6 to 12% of total amount of StOO and POO components, 25% or less of POSt component and having 40 or less of iodine value, 23° C. or more of a minimum temperature and 27.5° C. or more of a maximum temperature in a cooling curve determined by Jensen method (Patent Document 5), and an oil-and-fat composition comprising lipophilic emulsifier having an effect of delaying crystallization (Patent Document 6) are proposed.

However, the effect of solving the problem due to an oil-and-fat migration by the above-mentioned prior art is considered to be insufficient in recent years. It is because to coat chocolate to baked confectionery more thinly and a combination with a chocolate including higher amount of milk powder tend to be preferred in recent years, and such confectionery tends to show oil-and-fat migration and following low temperature bloom and softening of chocolate more significantly.

Therefore, there has been a strong demand from the market for a technology for preventing an oil-and-fat migration and following bloom and softening of chocolate.

PRIOR ART DOCUMENTS

Patent Documents

Patent Document 1: JP H09-176680 A
Patent Document 2: JP H05-284912 A
Patent Document 3: JP 2001-131574 A
Patent Document 4: JP H06-311845 A
Patent Document 5: JP H01-120250 A
Patent Document 6: WO 2007/91529 A Non-Patent Documents Non-Patent Document 1: "Monitoring and Controlling Oil Migration in Peanut Butter Confections" (Jhon J. Shuleva, "The Manufacturing Confectioner" May 1989, pp. 72-74

SUMMARY OF THE INVENTION

Problems to be Solved by the Invention

Therefore, an object of the present invention is to provide an oil-and-fat composition for tempering chocolate capable of preventing oil-and-fat migration in a composite confectionery in which chocolate and oil-and-fat based food material are combined and capable of providing a chocolate having excellent resistance to low temperature bloom and softening due to the oil-and-fat migration and having excellent meltability in the mouth, a tempering chocolate comprising the oil-and-fat composition and a composite confectionery comprising the chocolate.

Means for Solving the Problems

The present inventors have intensively studied. As a result, they have found that a limitation of content of StLSt and StStO triglycerides relative to StOSt triglyceride contributes largely to the solution of the above-mentioned problem for the following reasons. The present invention has been completed on the basis of these findings.

That is, in a process of cooling and solidifying chocolate which includes cacao butter alternative which includes StOSt triglyceride and liquid oil-and-fat after tempering and combining an oil-and-fat based food material such as cookie, StOSt triglyceride in the chocolate oil-and-fat is solidified first and forms a structure of the chocolate. In this case, solidification rate of StOSt becomes slow when the content of StLSt and StStO triglyceride relative to StOSt triglyceride is high. As a result, an oil-and-fat migration from the oil-and-fat based food material is promoted because a period of keeping the StOSt triglyceride in a melting state becomes relatively-long although this triglyceride should be solidified.

In addition, regarding a property of crystal after the solidification, the content of StLSt and StStO triglycerides mixed in a crystal of the solidified StOSt triglyceride becomes high when the content of StLSt and StStO triglycerides relative to StOSt triglyceride is high. As a result, crystal with low density, i.e. crystal having a lot of gaps, is obtained and thereby the oil-and-fat migration from the oil-and-fat based food material is promoted.

Moreover, they have found that a limitation of content of StOO, POP and PPO triglycerides also contributes to the solution of the problem. The present invention has also been completed on the basis of these findings.

That is, the first aspect of the present invention is an oil-and-fat composition comprising 40 to 90 wt % of oil-and-fat (A) and 10 to 60 wt % of oil-and-fat (B), wherein the oil-and-fat (A) is an oil-and-fat comprising 50 wt % or more of StOSt, and the oil-and-fat (B) is an oil-and-fat which is liquid at 26° C., and wherein the oil-and-fat composition meets the following conditions (a), (b), (c) and (d):

(a) an SOS triglyceride content in the oil-and-fat composition is more than 45 wt %,
(b) an StOSt content in the oil-and-fat composition is 30 wt % or more,
(c) a ratio of StLSt/StOSt in the oil-and-fat composition is 0.08 or less, and
(d) a ratio of POO/StOO in the oil-and-fat composition is 0.50 or more, wherein S represents saturated fatty acid having C14 to C24, St represents stearic acid, P represents palmitic acid, L represents linoleic acid and O represents oleic acid, and SOS represents a triglyceride in which fatty acids at 1,3-positions are S and fatty acid at 2-position is O, StOSt represents a triglyceride in which fatty acids at 1,3-positions are St and fatty acid at 2-position is O, StLSt represents a triglyceride in which fatty acids at 1,3-positions are St and fatty acid at 2-position is L, POO represents a triglyceride in which fatty acids at 1,2-positions or 2,3-positions are O and fatty acid at 3-position or 1-position is P and StOO represents a triglyceride in which fatty acids at 1,2-positions or 2,3-positions are O and fatty acid at 3-position or 1-position is St.

The second aspect of the present invention is the oil-and-fat composition according to the first aspect, wherein an StOO content in the oil-and-fat composition is 10 wt % or less.

The third aspect of the present invention is the oil-and-fat composition according to the first or second aspect, wherein a ratio of StStO/StOSt in the oil-and-fat composition is 0.03 or less, wherein StStO represents a triglyceride in which fatty acids at 1,2-positions or 2,3-positions are St and fatty acid at 3-position or 1-position is O.

The fourth aspect of the present invention is the oil-and-fat composition according to any one of the first to third aspects, wherein a total content of POP and PPO in the oil-and-fat composition is 16 wt % or less, wherein POP represents a triglyceride in which fatty acids at 1,3-positions are P and fatty acid at 2-position is O and PPO represents a triglyceride in which fatty acids at 1,2-positions or 2,3-positions are P and fatty acid at 3-position or 1-position is O.

The fifth aspect of the present invention is the oil-and-fat composition according to any one of the first to fourth aspects, wherein the oil-and-fat (A) comprises arachidic acid at a content of not more than 10 wt % relative to constituent fatty acid in the oil-and-fat (A).

The sixth aspect of the present invention is the oil-and-fat composition according to any one of the first to fifth aspects, wherein the oil-and-fat (A) is an oil-and-fat comprising high melting point fraction or mid fraction which is obtained by fractionating an interesterified oil by solvent fractionation or dry fractionation, wherein the interesterified oil is obtained by subjecting high-oleic plant oil comprising oleic acid at 80 wt % or more relative to constituent fatty acid in the high-oleic plant oil, and stearic acid or stearic acid alcohol ester to interesterification with 1,3-position-specific lipase.

The seventh aspect of the present invention is a cacao butter alternative comprising the oil-and-fat composition according to any one of the first to sixth aspects.

The eighth aspect of the present invention is a chocolate comprising the cacao butter alternative according to the seventh aspect.

The ninth aspect of the present invention is a composite confectionery comprising the chocolate according to the eighth aspect in combination with an oil-and-fat based food material.

Effect of the Invention

A chocolate having excellent resistance to low temperature bloom and softening due to the oil-and-fat migration and having excellent meltability in the mouth can be obtained by using an oil-and-fat composition including StOSt triglyceride and liquid oil, and specific amount or less of StLSt, StOO, StStO, POP and PPO triglycerides, and specific amount or more of POO triglyceride.

Mode for Carrying Out the Invention

Measurement Method

A content of each triglycerides in an oil-and-fat composition can be determined as a total of symmetric and asymmetric triglyceride (e.g. a total of StStO content and StOSt content) with the following high performance liquid chromatography (1). In addition, composition of symmetric triglyceride or asymmetric triglyceride can be measured as (e.g. StStO/(StStO+StOSt)). And each of StStO and StOSt contents can be determined by multiplying this result by the result from the (1).

(1) The high performance liquid chromatography was carried out with (column: ODS, eluent: acetone/acetonitrile=80/20, elution rate: 0.9 ml/minute, column temperature: 25° C., detector: differential refraction type).

(2) The thin layer chromatography was carried out with (plate: a silver nitrate thin layer plate, development solvent: benzene/hexane/diethyl ether=75/25/2, detector: a densitometer).

An oil-and-fat composition of the present invention must include 45 wt % or more, preferably 55 wt % or more, more preferably 65 wt % or more of SOS triglyceride. When an oil-and-fat composition including less than 45 wt % of SOS triglyceride is used as a cacao butter alternative, it is not preferable because softening of chocolate occurs and compatibility with cacao butter becomes bad.

An oil-and-fat composition of the present invention must include 30 wt % or more, 35 or more, more preferably 40 wt % or more of StOSt. When an oil-and-fat composition including less than 30 wt % of StOSt triglyceride is used as a cacao butter alternative, it is not preferable because heat resistance of the chocolate is reduced. In addition, it is preferable that the StOSt content is not more than 70%. When the StOSt content is more than 70%, it is not preferable because a resistance to oil-and-fat migration is reduced and low temperature bloom tends to be generated.

An oil-and-fat composition of the present invention must have 0.08 or less, preferably 0.06 or less, more preferably 0.03 or less of a ratio of StLSt/StOSt. When the ratio of StLSt/StOSt is more than 0.08, as the above-mentioned, migration of liquid oil from an oil-and-fat based food material is promoted, resistance to oil-and-fat migration is lowered and low temperature bloom tends to be generated because solidification of StOSt triglyceride is delayed and density of StOSt crystal becomes low. Therefore, it is not preferable.

An oil-and-fat composition of the present invention must have 0.5 or more, preferably 1.0 or more, more preferably 2.0 or more of a ratio of POO/StOO. When the ratio of POO/StOO is less than 0.5, it is not preferable because resistance to oil-and-fat migration is lowered and low temperature bloom tends to be generated because a rate for stabilizing oil-and-fat crystal is delayed and a period of keeping wide gaps of oil-and-fat crystal is long, and thereby migration of liquid oil from an oil-and-fat based food material continues for a long term.

An oil-and-fat composition of the present invention preferably includes 10 wt % or less, more preferably 5 wt % or less of StOO. When the StOO content is more than 10 wt %, it is not preferable because resistance to oil-and-fat migration is lowered and low temperature bloom tends to be generated.

An oil-and-fat composition of the present invention preferably has 0.03 or less, more preferably 0.02 or less, most preferably 0.015 or less of a ratio of StStO/StOSt. When the ratio of StStO/StOSt is more than 0.03, as the above-mentioned, migration of liquid oil from an oil-and-fat based food material is promoted, resistance to oil-and-fat migration is lowered and low temperature bloom tends to be generated because solidification of StOSt triglyceride is delayed and density of StOSt crystal becomes low. Therefore, it is not preferable.

An oil-and-fat composition of the present invention preferably has 16 wt % or less, more preferably 13% or less, most preferably 10% or less of total content of POP and PPO. When the total content of POP and PPO is more than 16 wt %, it is not preferable because POP and PPO are dissolved in liquid oil migrated from an oil-and-fat based food material, and then recrystallized on chocolate surface, which results in low temperature bloom.

In addition, the oil-and-fat composition of the present invention preferably includes 3 wt % or less, more preferably 2 wt % or less, most preferably 1 wt % or less of SSS (a triglyceride in which all constituent fatty acids are S). When the SSS content is more than 3 wt %, texture of the chocolate tends to waxy.

An oil-and-fat composition of the present invention must include oil-and-fat (A), which includes 50 wt % or more of StOSt, and oil-and-fat (B), which is liquid at 26° C., as a part of the formulation. It is necessary that the amount of the oil-and-fat (A) is 40 to 90 wt % and that the amount of the oil-and-fat (B) is 10 to 60 wt %. Preferably, the amount of the oil-and-fat (A) is 50 to 80 wt %, and preferably, the amount of the oil-and-fat (B) is 20 to 50 wt %. When the amount of the oil-and-fat (A) is more than 90 wt %, it is not preferable because oil-and-fat migration due to a concentration difference is promoted because a difference of the liquid oil content between chocolate including the oil-and-fat composition of the present invention and an oil-and-fat based food material to be combined with the chocolate is large. In addition, when the amount of the oil-and-fat (A) is less than 40 wt %, the chocolate is significantly softened, and thereby the commercial value is lost.

The oil-and-fat (B), which is liquid at 26° C., to be added to an oil-and-fat composition of the present invention includes, for example, plant oil such as rapeseed oil, rice bran oil, soybean oil, cottonseed oil, corn oil, olive oil, safflower oil, safflower oil, sesame oil, sunflower oil, palm oil, coconut oil and shea butter, processed oil-and-fat thereof such as interesterified oil, partially hydrogenated oil, fractionated hydrogenated oil and fractionated oil. Preferably, rice bran oil and palm low melting point fraction (palm olein, super palm olein etc.) are preferable as an oil-and-fat having low StOO content and high POO content.

Arachidic acid content in the oil-and-fat (A) to be added to an oil-and-fat composition of the present invention is preferably 10 wt % or less, more preferably wt % or less, most preferably 1 wt % or less. When the arachidic acid content is more than 10 wt %, it is not preferable because increased StOA or AOA component become a factor of inhibiting a crystallization of StOSt which is major components of the crystal due to a difference of the fatty acid chain length.

Plant oil-and-fat as a raw material of the oil-and-fat (A) to be added to an oil-and-fat composition of the present invention includes, for example, an oil-and-fat including high melting point fraction or mid fraction which is obtained by fractionating an interesterified oil by solvent fractionation or dry fractionation, where the interesterified oil is obtained by subjecting high-oleic plant oil including oleic acid at 80 wt % or more relative to constituent fatty acid in the high-oleic plant oil, and stearic acid or stearic acid alcohol ester to interesterification with 1,3-position-specific lipase. The high-oleic plant oil includes, for example, sunflower oil, rapeseed oil, safflower oil, soybean oil etc. having 80 wt % or more, preferably 85 wt % or more, more preferably 90 wt % or more of oleic acid content. When subjecting a raw material oil including less than 80 wt % of oleic acid and stearic acid or stearic acid alcohol ester to interesterification with 1,3-position-specific lipase, it is not preferable because a ratio of StLSt/StOSt in the obtained interesterified oil is high, and thereby the oil-and-fat composition of the present invention cannot be effectively obtained.

In addition, other examples of plant oil-and-fat as a raw material of the oil-and-fat (A) includes, for example, plant oil-and-fat such as allanblackia fat, shea butter and sal fat, an oil-and-fat including high melting point fraction or mid fraction which is obtained by fractionating said plant oil-and-fat by solvent fractionation or dry fractionation. As an oil-and-fat in which arachidic acid content in the constituent fatty acid is low, oil interesterified with lipase of which raw materials are high-oleic plant oil, and stearic acid or stearic acid alcohol ester, and fractionated oil thereof; or allanblackia fat, and fractionated oil thereof are preferable.

Lipase which can be used in the present invention includes 1,3-position-specific lipase, and especially, one or two or more of 1,3-position-specific lipases obtained from the group consisting of genus *Rhizopus*, genus *Mucor*, genus *Aspergillus*, genus *Alcaligenes* and genus *Humicola* are preferable. When other lipase which does not have 1,3-position-specificity, for example lipase derived from genus *Candida*, is used, it is not preferable because the obtained interesterified oil has high StStSt content and low StOSt content, and thereby the oil-and-fat composition of the present invention cannot be effectively obtained.

In addition, these lipases are preferably used with immobilizing to immobilized carrier such as diatom earth, silica, ceramic, activated carbon and ion exchange resin.

The interesterification reaction can be carried out with either batch-wise or continuous process such as packed bed reactor, and the continuous process is preferable because it is effective.

In addition, interesterification reaction can be carried out in an organic solvent such as petroleum ether and n-hexane, but an organic solvent-free condition is preferable because process of removing organic solvent after the reaction is not necessary.

An oil-and-fat composition of the present invention can include an oil-and-fat other than the oil-and-fat (A) and oil-and-fat (B), as long as the other oil-and-fat does not inhibit the effect of the invention. An additive amount of the oil-and-fat other than the oil-and-fat (A) and oil-and-fat (B) is less than 30 wt %, preferably less than 20 wt %, more preferably less than 10 wt %, most preferably less than 5 wt % relative to total weight of the oil-and-fat composition.

A cacao butter alternative of the present invention includes 80 wt % or more, preferably 100 wt % of an oil-and-fat composition of the present invention. In addition, an optional component which is generally used for preparing confectionery, such as color, emulsifier, antioxidant and flavor, can be added. The additive amount thereof is 10 wt % or less, preferably 5 wt % or less, most preferably 2 wt % or less to the cacao butter alternative of the present invention.

The emulsifier includes glycerol fatty acid ester, sucrose fatty acid ester, sorbitan fatty acid ester, glycerol organic acid fatty acid ester, polyglycerin fatty acid ester, propylene glycol fatty acid ester, lecithin and the like.

A cacao butter alternative including an oil-and-fat composition of the present invention can be used for chocolate. In this case, the additive amount of the cacao butter alternative is preferably 5 to 50 parts by weight, more preferably 5 to 25 parts by weight, most preferably 5 to 15 parts by weight relative to 100 parts by weight of total ingredients in the chocolate.

A chocolate of the present invention includes dark chocolate made from ingredients including cacao mass, cocoa powder, saccharide such as sugar, oil-and-fat such as cocoa butter, emulsifier and flavor; milk chocolate made from ingredients including cacao mass, cocoa powder, saccharide such as sugar, oil-and-fat such as cocoa butter, milk product such as powdered whole milk, emulsifier and flavor; white chocolate made from ingredients including saccharide such as sugar, oil-and-fat such as cocoa butter, milk product such as powdered whole milk, emulsifier and flavor; and color chocolate obtained by coloring and flavoring the white chocolate with color and flavor. Chocolate is also classified into chocolate (cacao content: 35% or more), quasi chocolate (cacao content: 15% or more), milk chocolate (cacao content: 21% or more), quasi milk chocolate (cacao content: 7% or more), chocolate coating as a chocolate food (cacao content: 8% or more) and chocolate coating including dairy product (cacao content: 5% or more) depending on a cacao content, and the chocolate of the present invention includes all of the above chocolates.

In addition, a chocolate of the present invention obtained by using the above cacao butter alternative can prevent oil-and-fat migration in a composite confectionery and has excellent resistance to low temperature bloom and has excellent meltability in the mouth.

A composite confectionery of the present invention is a combination of chocolate and an oil-and-fat based food material. The oil-and-fat based food material includes, for example, chocolate, baked confectionery, snack, fried confectionery, cake, cream, candy, filling, nut paste and the like.

However, the oil-and-fat based food material is not limited to them as long as the food material includes liquid oil.

In addition, an oil-and-fat composition of the present invention can also be used for confectionery oil-and-fat such as oil-and-fat for kneading and oil-and-fat for cream, other than chocolate.

EXAMPLES

The Examples will be described in the following, but the present invention is not limited by the following Examples. In Examples, part and % mean a weight basis, unless otherwise specified.

Experimental Example 1

Preparation of StOSt-Containing Oil-and-Fat and StOO-Containing Oil-and-Fat

Thirty parts by weight of high-oleic sunflower oil having 86% of oleic acid content relative to the constituent fatty acid and 70 parts by weight of ethyl stearate were mixed and the mixture was subjected to interesterification using 1,3-position specific lipase to obtain a reaction oil. The reaction oil was distilled to remove ethyl ester, and StOSt content of the obtained oil was 40.0%. The obtained oil was subjected to solvent fractionation with acetone to obtain high melting point fractions in various yields. Each of the high melting point fractions were purified by conventional methods to obtain StOSt-containing fats A to D. In addition, the obtained oil-and-fat composition as the low melting point fraction was purified by conventional methods to obtain StOO-containing fat.

In addition, allanblackia fat was subjected to solvent fractionation with acetone, and the obtained oil-and-fat composition as the high melting point fraction was purified by conventional methods to obtain StOSt-containing fat E.

Further, degummed shea butter was subjected to solvent fractionation with acetone, and the obtained oil-and-fat composition as the high melting point fraction was purified by conventional methods to obtain StOSt-containing fat F.

Furthermore, sal fat was subjected to solvent fractionation with acetone, and the obtained oil-and-fat composition as the high melting point fraction was purified by conventional methods to obtain StOSt-containing fat G.

Moreover, 50 parts by weight of high-oleic sunflower oil having 86% of oleic acid content relative to the constituent fatty acid and 50 parts by weight of ethyl stearate were mixed and the mixture was subjected to interesterification using 1,3-position specific lipase to obtain a reaction oil. The reaction oil was distilled to remove ethyl ester, and StOSt content of the obtained oil was 24.0%. The obtained oil was subjected to solvent fractionation with acetone to obtain high melting point fraction. The obtained high melting point fraction was purified by conventional methods to obtain StOSt-containing fat H.

Fractionation yield, triglyceride composition, and arachidic acid content in the constituent fatty acid of each StOSt-containing fat are shown in the following.
StOSt-containing fat A (fractionation yield=14%, SOS=93.1%, StOSt=83.6%, StLSt=1.3%, StStO=0.4%, StOO=0.6%, arachidic acid content=1.3%)
StOSt-containing fat B (fractionation yield=27%, SOS=90.2%, StOSt=79.4%, StLSt=2.6%, StStO=0.6%, StOO=1.6%, arachidic acid content=1.0%)
StOSt-containing fat C (fractionation yield=40%, SOS=87.8%, StOSt=74.2%, StLSt=4.2%, StStO=0.8, StOO=3.0%, arachidic acid content=0.6%)
StOSt-containing fat D (fractionation yield=51%, SOS=80.2%, StOSt=65.4%, StLSt=6.1%, StStO=1.0%, StOO=7.1%, arachidic acid content=0.5%)
StOSt-containing fat E (fractionation yield=73%, SOS=79.8%, StOSt=77.1%, StLSt=0.1%, StStO=0.8%, StOO=5.0%, arachidic acid content=0.1%)
StOSt-containing fat F (fractionation yield=45%, SOS=86.2%, StOSt=76.1%, StLSt=4.3%, StStO=1.1%, StOO=2.9%, arachidic acid content=1.8%)
StOSt-containing fat G (fractionation yield=48%, SOS=90.5%, StOSt=60.1%, StLSt=0.9%, StStO=0.6%, StOO=1.9%, arachidic acid content=8.6%)
StOSt-containing fat H (fractionation yield=30%, SOS=79.8%, StOSt=65.0%, StLSt=6.2%, StStO=1.0%, StOO=7.2%, arachidic acid content=0.5%)

Also, triglyceride composition of the obtained StOO-containing fat is shown in the following.
StOO-containing fat (SOS=10.1%, StOSt=5.3%, StLSt=4.7%, StStO=0.5%, StOO=50.8%)

Experimental Example 2

Preparation of StStO-Containing Fat

High-oleic sunflower oil having 86% of oleic acid content relative to the constituent fatty acid and fully hydrogenated rapeseed oil were mixed and the mixture was subjected to random interesterification using sodium methylate to obtain a reaction oil. The reaction oil was subjected to solvent fractionation with acetone to remove high melting point fraction and low melting point fraction, and to obtain mid fraction at a yield of 29%. The obtained mid fraction was purified by conventional methods to obtain StStO fat (StOSt=22.4%, StLSt=2.5%, StOO=1.6%, arachidic acid content=0.5%).

Preparation of Oil-and-Fat (A)

Each StOSt-containing fat obtained in Experimental Example 1 and StStO-containing fat obtained in Experimental Example 2 were mixed to prepare various oils-and-fats (A) as shown in the following formulations:
Oil-and-fat (A)-1: StOSt-containing fat A alone,
Oil-and-fat (A)-2: StOSt-containing fat B alone,
Oil-and-fat (A)-3: StOSt-containing fat C alone,
Oil-and-fat (A)-4: StOSt-containing fat D alone,
Oil-and-fat (A)-5: StOSt-containing fat E alone,
Oil-and-fat (A)-6: StOSt-containing fat F alone,
Oil-and-fat (A)-7: StOSt-containing fat G alone,
Oil-and-fat (A)-8: Mixture of 61 parts by weight of StOSt-containing fat C and 1 part by weight of StStO-containing fat,
Oil-and-fat (A)-9: Mixture of 60 parts by weight of StOSt-containing fat C and 2 parts by weight of StStO-containing fat, and
Oil-and-fat (A)-10: StOSt-containing fat H alone.

All oils-and-fats (A) had 50 wt % or more of StOSt content and less than 10 wt % of arachidic acid content.

Preparation of Oil-and-Fat (B)

Various oils-and-fats (B) having formulations as shown in the following were prepared by using rapeseed oil ("Confectionery Cooking Oil": manufactured by Fuji Oil Co., Ltd.), soybean oil ("Soybean Refined Oil N": manufactured by Fuji Oil Co., Ltd.), high-oleic sunflower oil ("High-Ol 75B": manufactured by Fuji Oil Co., Ltd.), palm mid fraction ("Palmel 26": manufactured by Fuji Oil Co., Ltd.), palm olein ("Univer LNS": manufactured by Fuji Oil Co., Ltd.), super palm olein ("Palm Ace N": manufactured by Fuji Oil Co., Ltd.), and StOO-containing fat obtained in Example 1:

Oil-and-fat (B)-1: palm olein alone,

Oil-and-fat (B)-2: mixture of 25.9 parts by weight of palm olein and 5 parts by weight of super palm olein, Oil-and-fat (B)-3: super palm olein Oil-and-fat (B)-4: high-oleic sunflower oil alone, Oil-and-fat (B)-5: rapeseed oil alone, Oil-and-fat (B)-6: soybean oil alone, Oil-and-fat (B)-7: mixture of 15 parts by weight of super palm olein and 25 parts by weight of StOO-containing fat, Oil-and-fat (B)-8: StOO-containing fat alone, Oil-and-fat (B)-9: mixture of 10 parts by weight of palm olein and 30 parts by weight of palm mid fraction, and Oil-and-fat (B)-10: palm mid fraction alone.

All oils-and-fats (B) kept liquid state after storage at 26° C. for 1 day.

Examples 1 to 19

Comparative Examples 1 to 8

Each oil-and-fat (A) and each oil-and-fat (B) were mixed according to the formulations as shown in table 1 (unit: parts by weight) to obtain oil-and-fat compositions of Examples 1 to 19 and Comparative Examples 1 to 8. Each composition was shown in table 2.

TABLE 1

| | Oil-and-fat (A) | Additive amount of oil-and-fat (A) (parts by weight) | Oil-and-fat (B) | Additive amount of oil-and-fat (B) (parts by weight) |
|---|---|---|---|---|
| Example 1 | Oil-and-fat (A)-1 | 54.3 | Oil-and-fat (B)-1 | 45.7 |
| Example 2 | Oil-and-fat (A)-2 | 57.0 | Oil-and-fat (B)-1 | 43.0 |
| Example 3 | Oil-and-fat (A)-3 | 60.0 | Oil-and-fat (B)-1 | 40.0 |
| Comparative Example 1 | Oil-and-fat (A)-4 | 69.1 | Oil-and-fat (B)-2 | 30.9 |
| Example 4 | Oil-and-fat (A)-5 | 60.0 | Oil-and-fat (B)-1 | 40.0 |
| Example 5 | Oil-and-fat (A)-6 | 60.0 | Oil-and-fat (B)-1 | 40.0 |
| Example 6 | Oil-and-fat (A)-7 | 60.0 | Oil-and-fat (B)-1 | 40.0 |
| Example 7 | Oil-and-fat (A)-3 | 90.0 | Oil-and-fat (B)-1 | 10.0 |
| Example 8 | Oil-and-fat (A)-3 | 75.0 | Oil-and-fat (B)-1 | 25.0 |
| Example 9 | Oil-and-fat (A)-3 | 45.0 | Oil-and-fat (B)-1 | 55.0 |
| Comparative Example 2 | Oil-and-fat (A)-3 | 35.0 | Oil-and-fat (B)-1 | 65.0 |
| Example 10 | Oil-and-fat (A)-3 | 90.0 | Oil-and-fat (B)-3 | 10.0 |
| Example 11 | Oil-and-fat (A)-3 | 75.0 | Oil-and-fat (B)-3 | 25.0 |
| Example 12 | Oil-and-fat (A)-3 | 60.0 | Oil-and-fat (B)-3 | 40.0 |
| Example 13 | Oil-and-fat (A)-3 | 45.0 | Oil-and-fat (B)-3 | 55.0 |
| Comparative Example 3 | Oil-and-fat (A)-3 | 35.0 | Oil-and-fat (B)-3 | 65.0 |
| Example 14 | Oil-and-fat (A)-3 | 60.0 | Oil-and-fat (B)-4 | 40.0 |
| Example 15 | Oil-and-fat (A)-3 | 60.0 | Oil-and-fat (B)-5 | 40.0 |
| Example 16 | Oil-and-fat (A)-3 | 60.0 | Oil-and-fat (B)-6 | 40.0 |
| Comparative Example 4 | Oil-and-fat (A)-3 | 60.0 | Oil-and-fat (B)-7 | 40.0 |
| Comparative Example 5 | Oil-and-fat (A)-3 | 60.0 | Oil-and-fat (B)-8 | 40.0 |
| Example 17 | Oil-and-fat (A)-3 | 60.0 | Oil-and-fat (B)-9 | 40.0 |
| Example 18 | Oil-and-fat (A)-3 | 60.0 | Oil-and-fat (B)-10 | 40.0 |
| Example 19 | Oil-and-fat (A)-8 | 62.0 | Oil-and-fat (B)-1 | 38.0 |
| Comparative Example 6 | Oil-and-fat (A)-9 | 62.0 | Oil-and-fat (B)-1 | 38.0 |
| Comparative Example 7 | Oil-and-fat (A)-3 | 100.0 | — | 0 |
| Comparative Example 8 | Oil-and-fat (A)-10 | 69.1 | Oil-and-fat (B)-2 | 30.9 |

TABLE 2

| | SOS content (%) | StOSt content (%) | POP + PPO content (%) | Ratio of StLSt/StOSt | Ratio of POO/StOO | StOO content (%) | StLSt content (%) | Ratio of StStO/StOSt | Iodine value |
|---|---|---|---|---|---|---|---|---|---|
| Example 1 | 65.4 | 45.6 | 12.5 | 0.016 | 6.6 | 1.7 | 0.8 | 0.006 | 41.9 |
| Example 2 | 65.4 | 45.5 | 11.7 | 0.033 | 4.7 | 2.2 | 1.5 | 0.008 | 41.4 |
| Example 3 | 65.7 | 45.3 | 11.0 | 0.056 | 3.3 | 3.0 | 2.6 | 0.011 | 41.1 |
| Comparative Example 1 | 64.5 | 45.3 | 7.9 | 0.092 | 1.4 | 5.9 | 4.2 | 0.015 | 41.0 |
| Example 4 | 60.9 | 46.0 | 11.1 | 0.002 | 2.3 | 4.2 | 0.1 | 0.011 | 40.9 |
| Example 5 | 64.7 | 45.2 | 11.3 | 0.057 | 3.4 | 2.9 | 2.6 | 0.015 | 41.2 |
| Example 6 | 67.3 | 35.9 | 10.9 | 0.016 | 4.1 | 2.3 | 0.6 | 0.011 | 40.9 |
| Example 7 | 82.3 | 67.8 | 2.9 | 0.055 | 0.9 | 3.0 | 3.8 | 0.010 | 33.2 |
| Example 8 | 74.0 | 56.6 | 7.0 | 0.056 | 2.1 | 3.0 | 3.2 | 0.010 | 37.1 |
| Example 9 | 57.4 | 34.1 | 15.1 | 0.056 | 4.5 | 2.9 | 1.9 | 0.011 | 45.1 |
| Comparative Example 2 | 51.9 | 26.7 | 17.8 | 0.057 | 5.3 | 2.9 | 1.5 | 0.012 | 47.7 |
| Example 10 | 80.3 | 67.7 | 1.2 | 0.055 | 1.2 | 3.1 | 3.8 | 0.010 | 34.3 |

TABLE 2-continued

|  | SOS content (%) | StOSt content (%) | POP + PPO content (%) | Ratio of StLSt/StOSt | Ratio of POO/StOO | StOO content (%) | StLSt content (%) | Ratio of StStO/StOSt | Iodine value |
|---|---|---|---|---|---|---|---|---|---|
| Example 11 | 69.0 | 56.4 | 2.8 | 0.056 | 2.7 | 3.2 | 3.2 | 0.010 | 39.9 |
| Example 12 | 57.6 | 45.1 | 4.4 | 0.056 | 4.0 | 3.4 | 2.6 | 0.010 | 45.5 |
| Example 13 | 46.3 | 33.9 | 5.9 | 0.057 | 5.3 | 3.5 | 1.9 | 0.010 | 51.1 |
| Comparative Example 3 | 38.8 | 26.3 | 7.0 | 0.058 | 6.1 | 3.6 | 1.5 | 0.010 | 54.9 |
| Example 14 | 52.7 | 45.1 | 0.1 | 0.055 | 0.6 | 4.2 | 2.5 | 0.010 | 53.5 |
| Example 15 | 52.7 | 45.1 | 0.1 | 0.055 | 0.7 | 2.4 | 2.5 | 0.010 | 65.1 |
| Example 16 | 52.7 | 45.1 | 0.1 | 0.055 | 0.6 | 2.0 | 2.5 | 0.010 | 70.7 |
| Comparative Example 4 | 57.1 | 46.5 | 1.8 | 0.079 | 0.4 | 15.1 | 3.7 | 0.012 | 44.8 |
| Comparative Example 5 | 56.7 | 47.3 | 0.3 | 0.092 | 0.1 | 22.1 | 4.4 | 0.013 | 44.3 |
| Example 17 | 72.2 | 45.5 | 16.1 | 0.063 | 2.7 | 2.6 | 2.9 | 0.011 | 37.5 |
| Example 18 | 74.4 | 45.6 | 17.8 | 0.066 | 2.5 | 2.4 | 3.0 | 0.011 | 36.3 |
| Example 19 | 65.9 | 45.6 | 10.6 | 0.055 | 3.1 | 2.9 | 2.6 | 0.023 | 40.3 |
| Comparative Example 6 | 66.9 | 45.8 | 10.7 | 0.055 | 3.1 | 2.9 | 2.6 | 0.035 | 40.6 |
| Comparative Example 7 | 87.8 | 75.2 | 0.2 | 0.055 | 0.1 | 3.0 | 4.2 | 0.010 | 30.5 |
| Comparative Example 8 | 64.2 | 45.0 | 8.0 | 0.095 | 1.4 | 6.0 | 4.2 | 0.015 | 41.1 |

Examination Example 1

Chocolate was prepared by conventional method and using the oil-and-fat compositions obtained in Examples 1 to 19 and Comparative Examples 1 to 8 according to the formulation of table 3.

TABLE 3

| Ingredient | Additive amount (parts by weight) |
|---|---|
| Cacao mass | 13.0 |
| Whole fat milk powder | 23.0 |
| Sugar | 42.7 |
| Cocoa butter | 11.3 |
| Oil-and-fat composition | 10.0 |
| Lecithin | 0.3 |
| Flavor | 0.02 |

The chocolate prepared according to the formulation of table 3 was molten and subjected to tempering, and then, cookie prepared by conventional method according to the formulation of table 4 was dipped into the chocolate to obtain chocolate cookie having a ratio of 1 part by weight of chocolate to 3 parts by weight of cookie. The obtained chocolate cookie was subjected to a storage test at 20° C. for one month. The following evaluations were carried out to the chocolate cookie after the one month storage. The results were shown in table 5.

The surface condition of the chocolate was rated as good when it was similar to the condition before the storage test. On the other hand, the surface condition of the chocolate was rated as defective when the surface was whitened after the storage test by generating low temperature bloom.

Percentage of migration of oil into the chocolate was calculated by the equation below by using values of StOSt contents in each of the oil components extracted from the chocolate and cookie before and after the storage, measured by the above-mentioned method.

Percentage of migration of oil into chocolate=[(StOSt content in the oil component of chocolate after storage−StOSt content in the oil component of chocolate before storage)/(StOSt content in the oil component of cookie before storage−StOSt content in the oil component of chocolate before storage)]×100

Evaluation of meltability in the mouth of the chocolate was carried out with sensory evaluation by 5 panelists. In the evaluation, chocolate which has appropriate hardness in biting and which melts rapidly in the mouth, i.e. chocolate having typical chocolate texture, was rated as good.

Softening of the chocolate was evaluated by pressing spatula to the chocolate under the atmosphere of 20° C. When chocolate was not adhered to spatula, it is rated as good. When chocolate was slightly adhered to spatula, it is rated as slightly defective. When chocolate was adhered to spatula, it is rated as defective.

TABLE 4

| Ingredient | Additive amount (parts by weight) |
|---|---|
| Soft flour | 100 |
| Butter | 50 |
| Superfine sugar | 40 |
| Whole egg | 15 |
| Water | 15 |

TABLE 5

|  | Surface condition of chocolate | Percentage of migration of oil into chocolate | Meltability in the mouth of chocolate | Softening of chocolate |
|---|---|---|---|---|
| Example 1 | Good | 5.5 | Good | Good |
| Example 2 | Good | 6.5 | Good | Good |
| Example 3 | Good | 7.9 | Good | Good |
| Comparative Example 1 | Defective | 13.2 | Slightly defective, soft when biting | Slightly defective |
| Example 4 | Good | 5.4 | Good | Good |
| Example 5 | Good | 7.7 | Good | Good |
| Example 6 | Good | 8.3 | Good | Good |
| Example 7 | Good | 8.8 | Good | Good |
| Example 8 | Good | 8.6 | Good | Good |
| Example 9 | Good | 7.9 | Good | Good |
| Comparative Example 2 | Good | 6.9 | Defective, soft when biting | Defective |
| Example 10 | Good | 7.8 | Good | Good |
| Example 11 | Good | 7.0 | Good | Good |

TABLE 5-continued

| | Surface condition of chocolate | Percentage of migration of oil into chocolate | Meltability in the mouth of chocolate | Softening of chocolate |
|---|---|---|---|---|
| Example 12 | Good | 7.2 | Good | Good |
| Example 13 | Good | 6.5 | Good | Good |
| Comparative Example 3 | Good | 6.5 | Defective, soft when biting | Defective |
| Example 14 | Good | 6.8 | Good | Good |
| Example 15 | Good | 6.9 | Good | Good |
| Example 16 | Good | 7.1 | Good | Good |
| Comparative Example 4 | Defective | 11.5 | Defective, soft when biting | Defective |
| Comparative Example 5 | Defective | 12.2 | Defective, soft when biting | Defective |
| Example 17 | Slightly defective | 10.3 | Slightly defective, soft when biting | Good |
| Example 18 | Slightly defective | 11.0 | Slightly defective, soft when biting | Good |
| Example 19 | Good | 9.5 | Good | Good |
| Comparative Example 6 | Slightly defective | 10.5 | Slightly defective | Slightly defective |
| Comparative Example 7 | Defective | 10.8 | Slightly defective, too hard when biting | Good |
| Comparative Example 8 | Defective | 13.5 | Slightly defective, soft when biting | Slightly defective |

As shown in the results of table 5, when the oil-and-fat compositions obtained in Examples 1 to 19 are used, a migration of liquid oil from cookie to the chocolate and whitening of the chocolate can be prevented, good meltability in the mouth of the chocolate can be obtained and softening of the chocolate can also be prevented.

INDUSTRIAL APPLICABILITY

A bloom and softening of chocolate due to an oil-and-fat migration from an oil-and-fat based food material to the chocolate can be prevented by combining the chocolate including an oil-and-fat composition of the present invention with the oil-and-fat based food material, where the oil-and-fat composition has specific triglyceride composition. The present invention can provide an oil-and-fat composition for chocolate, having such an effect and a composite confectionery obtained by using the oil-and-fat composition.

The invention claimed is:

1. An oil-and-fat composition comprising 40 to 90 wt % of oil-and-fat (A) and 10 to 60 wt % of oil-and-fat (B), wherein
    the oil-and-fat (A) is an oil-and-fat comprising 50 wt % or more of StOSt, and
    the oil-and-fat (B) is an oil-and-fat which is liquid at 26° C., and wherein the oil-and-fat composition meets the following conditions (a), (b), (c), (d), (e) and (f):
    (a) an SOS triglyceride content in the oil-and-fat composition is 45 to 74 wt %,
    (b) an StOSt content in the oil-and-fat composition is 30 wt % or more,
    (c) a ratio of StLSt/StOSt in the oil-and-fat composition is 0.08 or less,
    (d) a ratio of POO/StOO in the oil-and-fat composition is 0.60 or more,
    (e) a total content of POP and PPO in the oil-and-fat composition is 16 wt % or less, and
    (f) a ratio of StStO/StOSt in the oil-and-fat composition is 0.03 or less,
    wherein S represents saturated fatty acid having C14 to C24, St represents stearic acid, P represents palmitic acid, L represents linoleic acid and O represents oleic acid, and SOS represents a triglyceride in which fatty acids at 1,3-positions are S and fatty acid at 2-position is O, StOSt represents a triglyceride in which fatty acids at 1,3-positions are St and fatty acid at 2-position is O, StLSt represents a triglyceride in which fatty acids at 1,3-positions are St and fatty acid at 2-position is L, POO represents a triglyceride in which fatty acids at 1,2-positions or 2,3-positions are O and fatty acid at 3-position or 1-position is P, StOO represents a triglyceride in which fatty acids at 1,2-positions or 2,3-positions are O and fatty acid at 3-position or 1-position is St, POP represents a triglyceride in which fatty acids at 1,3-positions are P and fatty acid at 2-position is O, PPO represents a triglyceride in which fatty acids at 1,2-positions or 2,3-positions are P and fatty acid at 3-position or 1-position is O and StStO represents a triglyceride in which fatty acids at 1,2-positions or 2,3-positions are St and fatty acid at 3-position or 1-position is O.

2. The oil-and-fat composition according to claim 1, wherein an StOO content in the oil-and-fat composition is 10 wt % or less.

3. The oil-and-fat composition according to claim 1, wherein a ratio of StStO/StOSt in the oil-and-fat composition is 0.02 or less.

4. The oil-and-fat composition according to claim 1, wherein a ratio of POO/StOO in the oil-and-fat composition is 1.0 or more.

5. The oil-and-fat composition according to claim 1, wherein the oil-and-fat (A) comprises arachidic acid at a content of not more than 10 wt % relative to constituent fatty acid in the oil-and-fat (A).

6. The oil-and-fat composition according to claim 1, wherein the oil-and-fat (A) is an oil-and-fat comprising high melting point fraction or mid fraction which is obtained by fractionating an interesterified oil by solvent fractionation or dry fractionation, wherein the interesterified oil is obtained by subjecting high-oleic plant oil comprising oleic acid at 80 wt % or more relative to constituent fatty acid in the high-oleic plant oil, and stearic acid or stearic acid alcohol ester to interesterification with 1,3-position-specific lipase.

7. A cacao butter alternative comprising the oil-and-fat composition according to claim 1.

8. A chocolate comprising the cacao butter alternative according to claim 7.

9. A composite confectionery comprising the chocolate according to claim 8 in combination with an oil-and-fat based food material.

10. A process for preventing a low temperature bloom or softening of chocolate comprising using the cacao butter alternative according to claim 7.

* * * * *